(No Model.) 2 Sheets—Sheet 1.
M. M. NATHANSON.
CHECK FOR HORSES.
No. 255,882. Patented Apr. 4, 1882.
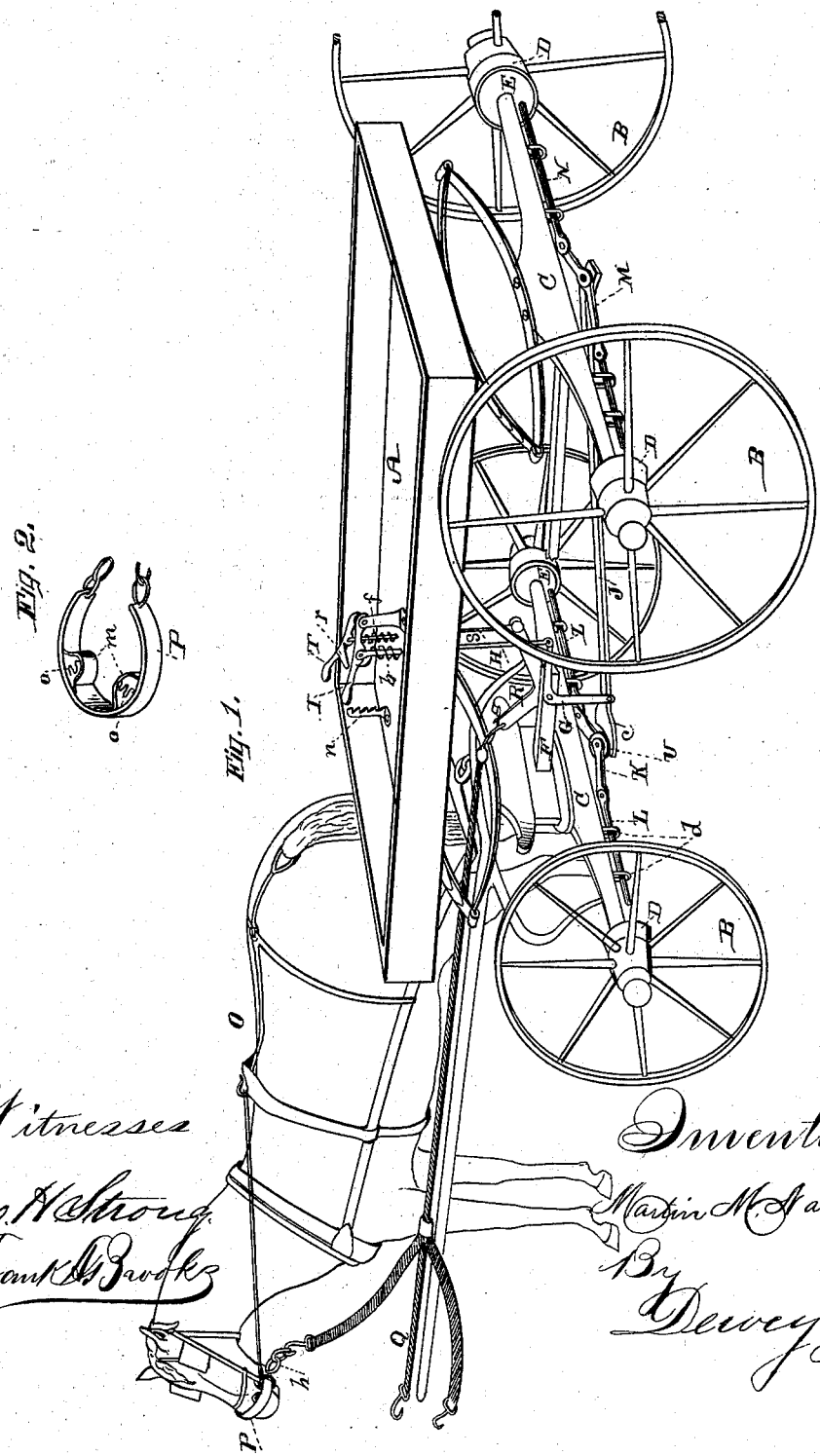

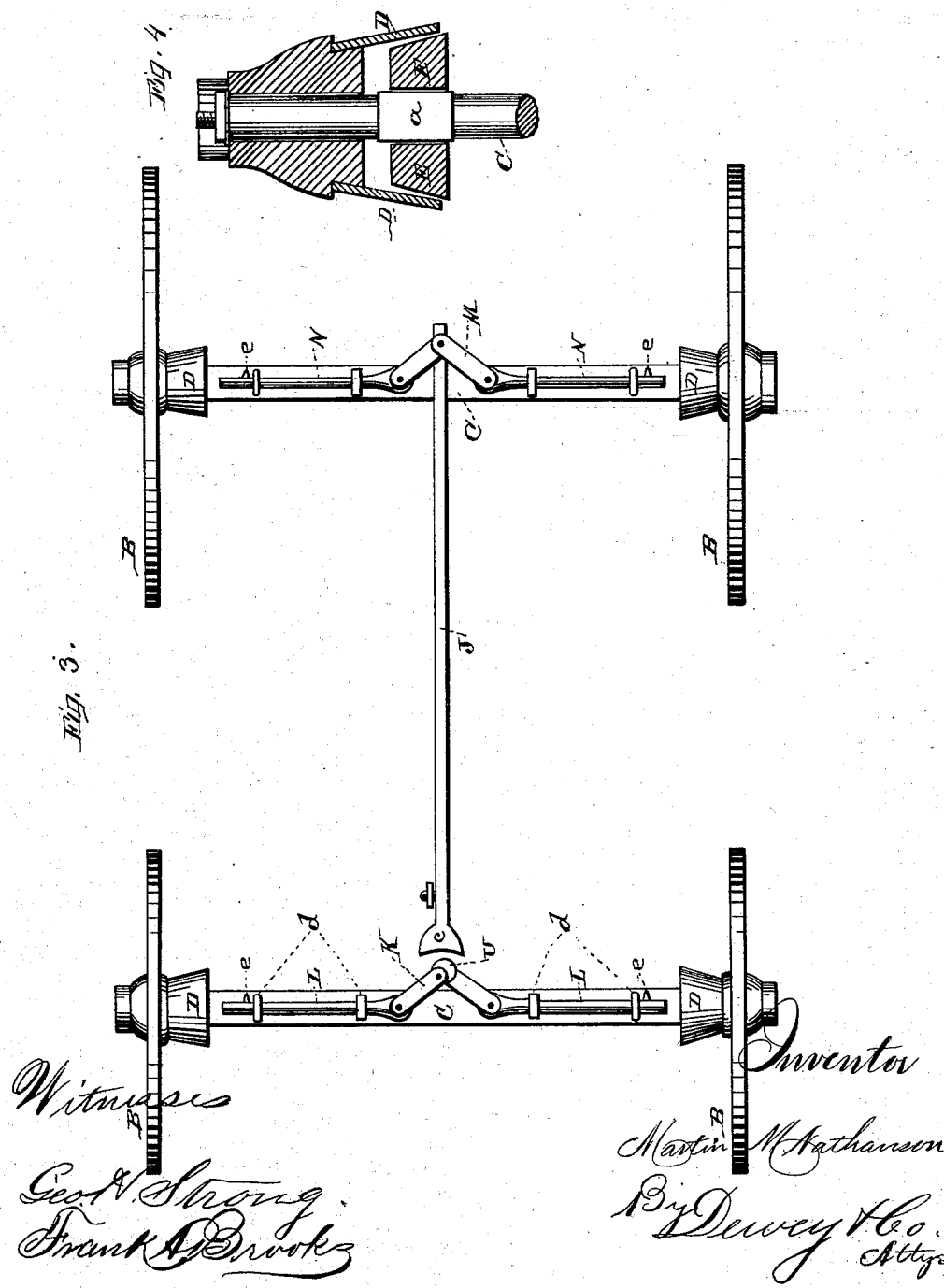

UNITED STATES PATENT OFFICE.

MARTIN M. NATHANSON, OF SAN FRANCISCO, CALIFORNIA.

CHECK FOR HORSES.

SPECIFICATION forming part of Letters Patent No. 255,882, dated April 4, 1882.

Application filed July 27, 1881. (No model.)

*To all whom it may concern:*

Be it known that I, MARTIN M. NATHANSON, of the city and county of San Francisco, State of California, have invented a Check for Horses; and I hereby declare the following to be a full, clear, and exact description thereof.

My invention relates to a check for horses; and it consists of a peculiar strap adapted to fit over the nostrils of a horse, with means for tightening the same when desired. It further consists of a lever and cord or strap attached to said nose-strap, by means of which the nose-strap may be tightened from a vehicle to which the horse is harnessed.

A brake attachment for the vehicle, working in connection therewith, is herein shown and described; but no claim is made therefor, as it will form the subject of a separate application for Letters Patent.

The means for accomplishing the object of my invention will be fully seen in the following specification and accompanying drawings, in which—

Figure 1 is a perspective view of the device. Fig. 2 is a detail of the nose-loop. Fig. 3 is a plan of the breaking apparatus. Fig. 4 is a section through the hub.

Let A represent the body of the vehicle, B the wheels, and C the axles. The wheels B have the inner ends of their hubs formed into or have attached firmly thereto a conical piece, D, hollowed out, as shown, and having its larger portion toward the middle. The axles C are formed just within their round ends into a square portion, (marked $a$,) over which is fitted a conical section, E, so that while adapted to slide out and back, it cannot turn on the axle. This piece E has its smallest portion toward the outside, and fits loosely within the hollow conical hub D of the wheels, thus forming a bearing for the said hubs. The same device is upon all the wheels, as shown.

F represents the reach or brace between the running-gear. Pivoted to the forward end of this reach, on one side, is a bell-crank lever, G, one end of which is pivoted to a rod, H, which extends up through the bottom of the vehicle, and is pivoted to a foot-lever, I. A spring, $b$, holds the rod and lever up. The other end of the bell-crank lever G is pivoted to a horizontal bar or rod, J, which extends rearwardly longitudinally past the rear axle. The forward end of this rod J is provided with a head, $c$, for better convenience in impinging upon and operating the toggle-lever K, the ends of which are pivoted to rods L L on each side, lying under the forward axle and supported in guides $d\ d$. The ends of these rods L L extend toward and touch the lower parts of the conical sections E. The rear end of the rod J is pivoted to the toggle-lever M, the ends of which are pivoted to the rods N N, similar to rods L L, and similarly supported under the rear axle as the said rods are in front. Small stops $e$ are placed upon the rods L L and N N outside of the guides to prevent too much play.

The operation of this device is as follows: By pressing upon the foot-lever I the rod H is pressed down. This presses down one arm of the bell-crank lever G and pushes forward the other arm, which forces the rod J forward. Its head presses upon the toggle-lever K, which forces the rods L L outwardly against the conical sections E and forces them into the hollow hubs D, and thus brakes the forward wheels. The rod J, in being forced forward, pulls upon the toggle-lever M, which forces the rods N N outwardly, their ends forcing the sections E within the hubs D, and thus braking the rear wheels. In this manner all the wheels have the brake applied at once, which is the object intended. When the foot is removed from the lever I the spring $b$ causes the rods L L and N N to return. The conical sections E, being relieved, no longer bind upon the wheels, which turn freely upon them.

Where the brake is applied to all the wheels of a vehicle it would be difficult to turn a corner without wrenching a wheel or breaking the pole or shafts. To provide for this I place in the knee or joint of the toggle-lever K a horizontal roller, U, journaled upon the pivot of said lever. It is upon this roller that the head $c$ of the rod J impinges when operating the toggle-lever. It thus forms a bearing or track which will allow the forward axle to be turned away from the rod J, and after being free from it the forward wheels are relieved from the brake and the vehicle can be turned.

Now, in connection with this device, to be operated at the same time and for greater security, I have the following device:

Let O represent the horse or horses. P is a strap, preferably composed of rubber covered with leather, which fits over the nose of the horse. These straps pass through the side rings of the bit, and their ends are joined by rings $h$ under the horse's mouth. Knobs $m$, composed of proper padding, are made on each side of the strap and press upon the nostrils, and yet prevent injury. A spring, $o$, is placed in the top of the strap, so that when not pulled upon the nostrils will be relieved.

To the rings in the ends of the straps P is attached a strap, Q, which extends rearwardly along the pole in suitable guides to the vehicle. Its end is attached to one arm of a bell-crank lever, R, pivoted to the other side of the reach F. The other arm of the lever R has pivoted to it a rod, S, which extends up through the bottom or floor of the body and is pivoted to a foot-lever, T. A spring, $f$, holds the rod and foot-lever up. The foot-lever I is lower than the lever T, which latter lever is provided with a side projection, $r$, so that when pressed down it presses down the lever I, and thus operates both devices. The two devices are thus dependent, though the braking device on the wheels can be operated independently. When the lever T is depressed it forces the padding or knobs $m$ of said strap upon the nostrils, thus checking the horse, and on account of being joined by the rings $h$ the ends of the strap are drawn close up under the mouth of the horse and prevent it from being opened. A ratchet, $n$, within the wagon-body secures the foot-lever T when pressed down.

It is obvious that this device may be applied to any number of horses by having branch straps from the main strap Q. If necessary, I could hold the conical sections E back upon the axles by means of springs.

This combined device will be useful in its application to teams which have a propensity for running away, for by one operation of pressing down the lever T the horses can be checked and the wagon stopped.

Having thus described my invention, what I claim as new, and desire to secure by Letters Patent, is—

1. The strap P, adapted to be placed over the nostrils of a horse, with means, substantially as described, for operating the same, as set forth.

2. The strap P, adapted to be placed over the nostrils of a horse, having pads $m$ for the purposes described, with means, substantially as described, for operating the same, in the manner set forth.

3. The combination of strap P, adapted to be placed over the nostrils of a horse, strap Q, lever R, rod S, and lever T, for the purposes set forth.

4. The means for checking horses, consisting of the strap P, with its pads $m$ and springs $o$, or equivalent device, fitting over the nostrils of the horse and adapted to be tightened or drawn by the strap Q, bell-crank lever R, rod S, spring $f$, and foot-levers T, substantially as herein described.

In witness whereof I have hereunto set my hand.

MARTIN M. NATHANSON.

Witnesses:
WM. F. BOOTH,
C. D. COLE.